United States Patent [19]

Chen

[11] Patent Number: 5,282,962
[45] Date of Patent: Feb. 1, 1994

[54] PROTEIN SKIMMER AND POWER HEAD THEREOF

[76] Inventor: Chi-Der Chen, No. 1-4, Lane 147, Hsia-Men St., Taipei, Taiwan

[21] Appl. No.: 915,120

[22] Filed: Jul. 17, 1992

[51] Int. Cl.$^5$ ............................................. A01K 63/04
[52] U.S. Cl. .................................. 210/169; 210/221.2; 210/416.2; 119/259
[58] Field of Search ................... 210/169, 221.1, 221.2, 210/416.2; 119/5

[56] References Cited

U.S. PATENT DOCUMENTS

| | | | |
|---|---|---|---|
| 3,616,919 | 3/1969 | Feddern | 210/169 |
| 3,965,007 | 6/1976 | Conn et al. | 210/169 |
| 3,994,811 | 11/1976 | Cohen et al. | 210/169 |
| 4,033,719 | 7/1977 | Conn et al. | 210/169 |
| 5,006,230 | 4/1991 | Votava, III | 210/169 |
| 5,078,867 | 1/1992 | Danner | 210/169 |

Primary Examiner—Peter Hruskoci
Assistant Examiner—Robert James Popovics

[57] ABSTRACT

A protein skimmer for clearing the impurities in an aquarium, comprising a skimmer body, an impurities collector, a top cover, a power head, an intermediate partition plate, a side partition plate, a transverse partition plate, a foam grid and a plurality of filtering cotton, wherein the impurities collector covers the top of the skimmer body and the upper end thereof is enclosed by the top cover. The foam grid is located at the interior of the lower end of the collector. The intermediate partition plate is disposed at the intermediate zone of the upper half portion of the skimmer body, so as to divide the internal space of the body into a large and a small bubble collecting chambers. The side and transverse partition plates are respectively located at the side and bottom of the small bubble chamber to define two filtering chambers therein. The power head is mounted to the lower portion of the skimmer body and is in connection with the large bubble collecting chamber at the water inlet of the body. By means of the aforementioned arrangement, the impurities and dirts in the water can be filtered by the bubbles and filtering cotton during the water circulation.

8 Claims, 11 Drawing Sheets

PROTEIN SKIMMER AND POWER HEAD THEREOF

FIELD OF THE INVENTION

The invention is directed to a protein skimmer, in particular a bubble type skimmer for clearing the impurities in an aquarium. The subject invention also discloses a power head (i.e. a water-air mixing type pump) which is adapted to be used in an aquarium or in the protein skimmer for discharging water having very fine air bubbles.

DESCRIPTIONS OF PRIOR ART

Conventional aquarium filters achieve the purpose of filtering to a certain extent by pumping water to flow through a plurality of filter screens, where the impurities or particles of various sizes are trapped in various filter screens having different sizes of sieve openings. However, such filters have the following drawbacks:

(1) Inconvenience in cleaning: After a period of use, the aquarium filters have to be dismounted completely for cleaning. The various filter screens must be disassembled separately and squeezed upon application of detergents in order to gradually remove the impurities and dirts trapped therein. After cleaning, the filter screens have to be reassembled before the filter may be placed into appropriate position for operation. The assembling and disassembling processes are time consuming and labor consuming.

(2) Inefficient in filtering: Since the filter screens are fixed in structure and sieve openings have predetermined dimensions, the filter screens would not operate effectively as the impurities/dirts are too minute. Besides, if the impurities/dirts are too much in volume or the particles are too big, the filter screens tend to be blocked, rendering the filtering ineffective.

To overcome the drawbacks of the conventional filter screen type skimmers, those skilled in the art have tried to replace the static filter screens by a dynamical foam type skimmer so as to achieve the purpose of easy cleaning. The characteristics and features of the dynamical foam type skimmer are as follows:

A circular telescopic conduit is inserted into an external sleeve of larger diameter. The sleeve has an impurities collecting ring removably connected to the top thereof. The bottom of the telescopic conduit is provided with a sleeve of larger diameter. A wood material or an air bubble stone connected to an air conduit is placed within the sleeve. When the air pump delivers air of suitable pressure to the wood material, the air will escape from the clearance of the wood material in the form of bubbles. During the upward movement of the bubbles, the bubbles will adhere the impurities in the water to the foam surface and gradually deliver the impurities to the impurities collecting ring, thereby purifying the aquarium water.

However, there are a number of drawbacks accompanying the foam type skimmer:

(1) The bubbles escaped from the wood material are too big. That is to say, the number of bubbles per unit volume water is insufficient, and thus a large proportion of minute impurities/dirts escapes from the clearances of the bubbles. Since there are retained impurities, the foam type skimmer fails to provide satisfiable filtering effects;

(2) Since the bubbles adhering impurities cannot completely become floating foam, and the foam type skimmer is not further provided with other filtering devices, a portion of the bubbles will escape outside the skimmer along with the water. Therefore, high quality filtering cannot be attained. Besides, there will be a layer of foam which is unpleasing in appearance formed on the water surface of the aquarium; and (3) The foam type skimmer merely occupies a small volume of the aquarium. The design concept of such skimmer lies in the assumption that an upward flow will be induced when the air escapes from the wood material to become foam, so that the water will flow towards the wood material disposed inside the sleeve to effect filtering of the overall water in the aquarium. However, such an assumption is not a fact but merely pure speculation. In fact, only slight upward flow of water is induced, and the flow causes little consequence in adhering the water circulating around the skimmer. On the other hand, the air bubbles escape from the clearances of the wood material tend to push the water surrounding the wood material away. Therefore, such kind of foam type skimmer fails to provide satisfiable filtering effects.

Furthermore, in order to effectively filter the water in an aquarium and increase the air content in the water, devices for supplying air or oxygen into the water of an aquarium are indispensable.

As is well-known, air pumps are usually used to deliver air to the wood material or bubble stone in the water. The air emerges through slits of the stone as air bubbles. However, the air bubbles produced in this way can hardly reach a satisfiable extend for those aquaria or protein skimmers of good quality. Besides, since the bubbles usually emerge up with significant force and reaction forces can be caused by the impact of the bubbles with the wall of the aquarium, it is very often that wavy surface of water is produced when the air pump turns on. This may impair the health of the fishes and produces unpleasing view to the aquarium.

Another way of providing air to the aquarium is to continuously pour the water downwardly into the aquarium after the water has been filtered. The downpour of water may cause mixing of air with water. Although it is a convenient process to introduce air into the water, the bubbles formed in this way are very coarse and the down-pour force may affect the decoration of the aquarium.

In order to overcome the above-mentioned drawbacks, a pump has been disclosed which includes an air inlet connected to a discharge tube provided between an impeller and a water outlet. The end of the air inlet is connected to an air hose which extends to the ambient air. When the pump is switched on, the water will be sucked via the water inlet by the impeller and rapidly be discharged via the water outlet. The fast flow of water in the discharge tube will produce suction force to suck ambient air into the tube to mix with the water. The water containing fine bubbles is then discharged from the water outlet.

This method of producing bubbles is unfit for practical use, however, since the pump cannot be mounted at more than 30 cm below the water level. When the pump is mounted at 30 cm in depth below the water level, the water pressure in the aquarium will cause "discharging resistances" which may retard the discharge of the water and adversely affect the suction of air from the atmosphere. As a result, the discharged water does not contain air bubbles.

BRIEF DESCRIPTION OF THE INVENTION

The object of the invention is to provide a skimmer having a pump capable of quickly mixing water and air, which may overcome the drawbacks of the conventional filter screen type and cylindrical foam type skimmers. The water drawn into the skimmer according to the invention contain minute bubbles of extremely high density which can effectively adhere the impurities in the water.

The other object of the invention is to provide a skimmer having effective circulation characteristics which not only may effectively filter the water delivered thereto by the pump, but also with the aid of swift and direct pumping of the pump, may readily absorb all the aquarium water to mix with the air before the water is delivered into the skimmer for proceeding adhesion and filtration.

The further object of the invention is to provide a high quality skimmer which may produce minute air bubbles to absorb/adhere the impurities in the water. Besides, the skimmer may also include filter cottons having suitable sieve pores to further clean the water which has been filtered by the bubbles.

The further object of the invention is to provide a skimmer of novel structure which may be connected to an ozone supplying device after a predetermined period of water filtration, so that the air is replaced by ozone which quickly mix with the water to form ozone bubbles, thereby effecting deodorization and decolorization of the filtered water.

Another object of the subject invention is to provide a power head structure which may discharge water containing very fine air bubbles. The power head can be utilized under water independent of the depth and pressure of the water so that the oxygen content in the water can be increased.

A further object of the subject invention is to provide a power head which is adapted to connect to a protein skimmer for effectively filtering the water in an aquarium.

Those skilled in the art will have a better understanding of the invention after reviewing the following descriptions with reference to the accompanying drawings.

BRIEF DESCRIPTION OF THE ACCOMPANYING DRAWINGS

DESCRIPTION OF PREFERRED EMBODIMENTS

Figure 1:
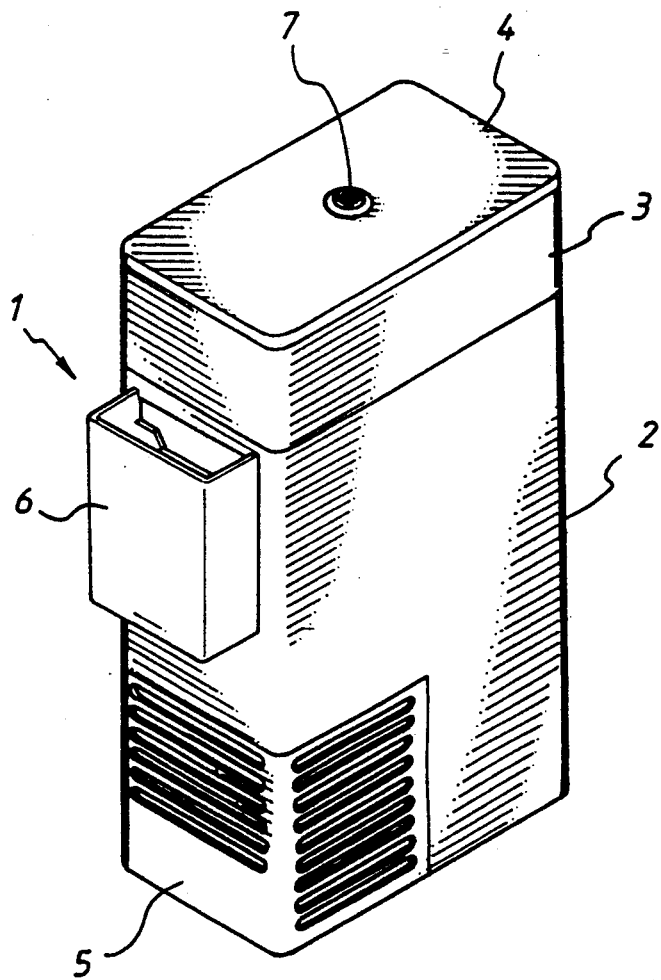
FIG. 1 is the perspective view of the protein skimmer in accordance with the invention.

With reference to FIG. 1, the protein skimmer (1) according to the invention comprises a skimmer body (2), an impurities collector (3), a top cover (4) and other optional elements.

Figure 2:
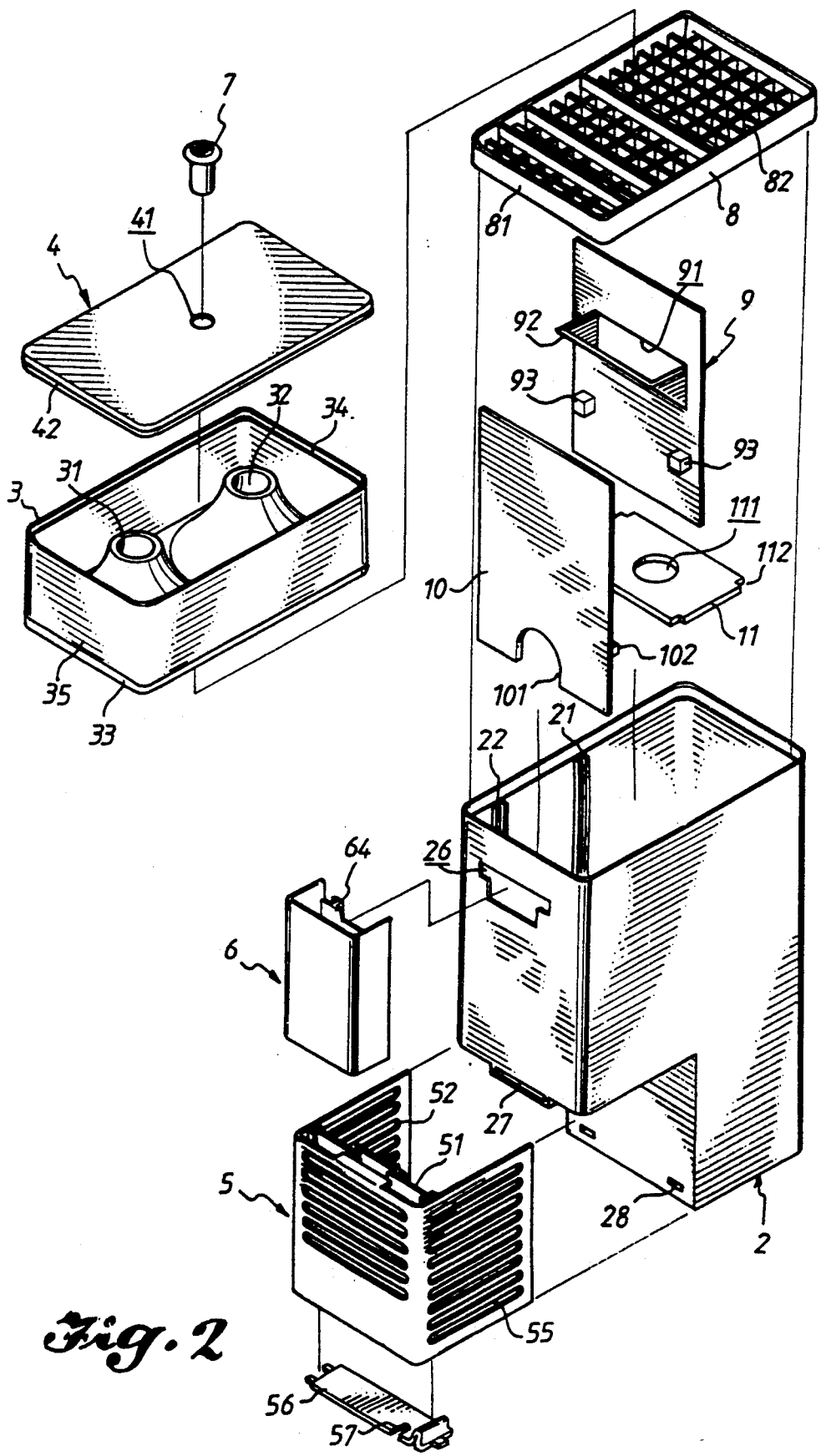
FIG. 2 is an exploded view of the invention.
Figure 3:
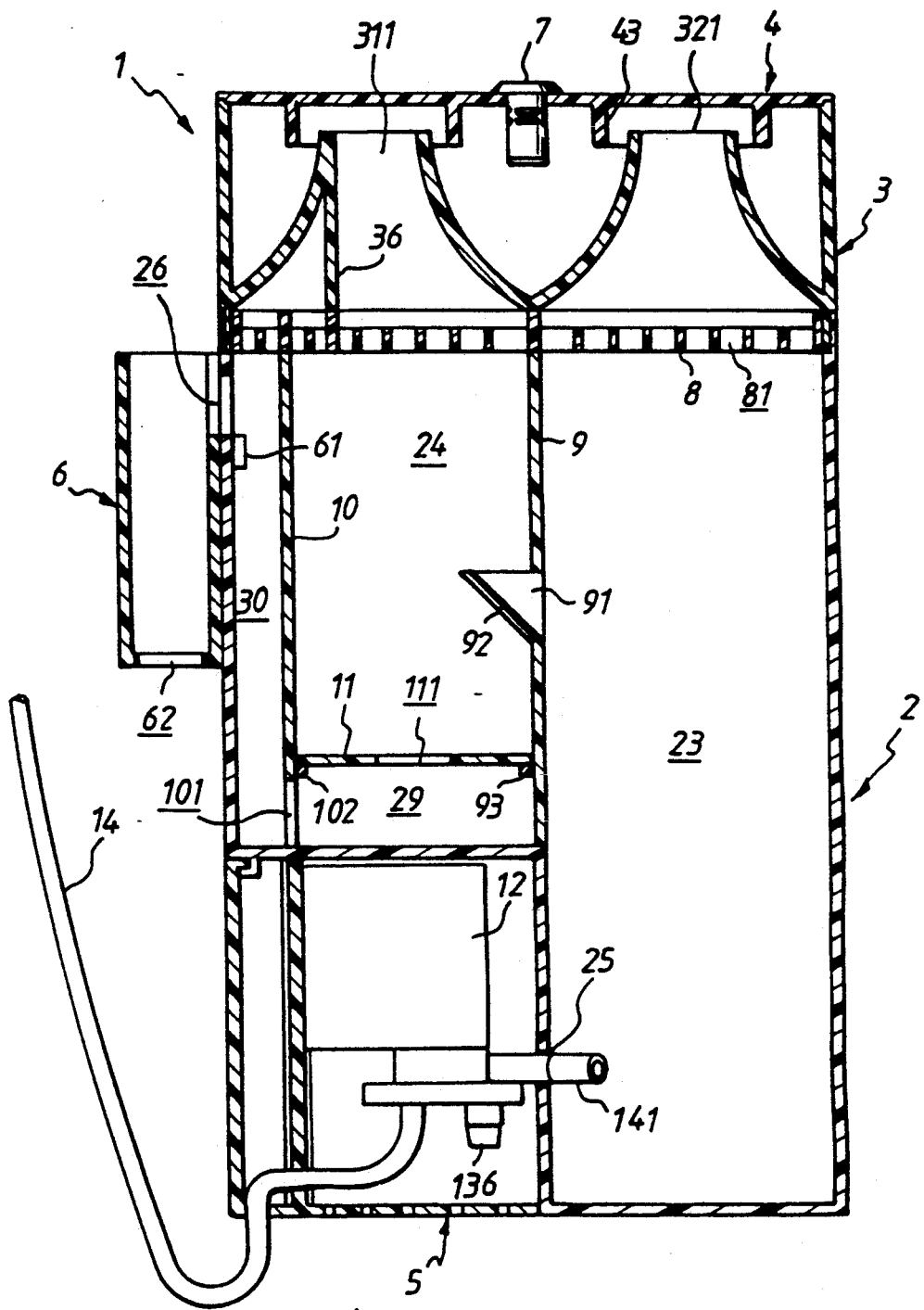
FIG. 3 is a sectional view of the invention.
Figure 6:
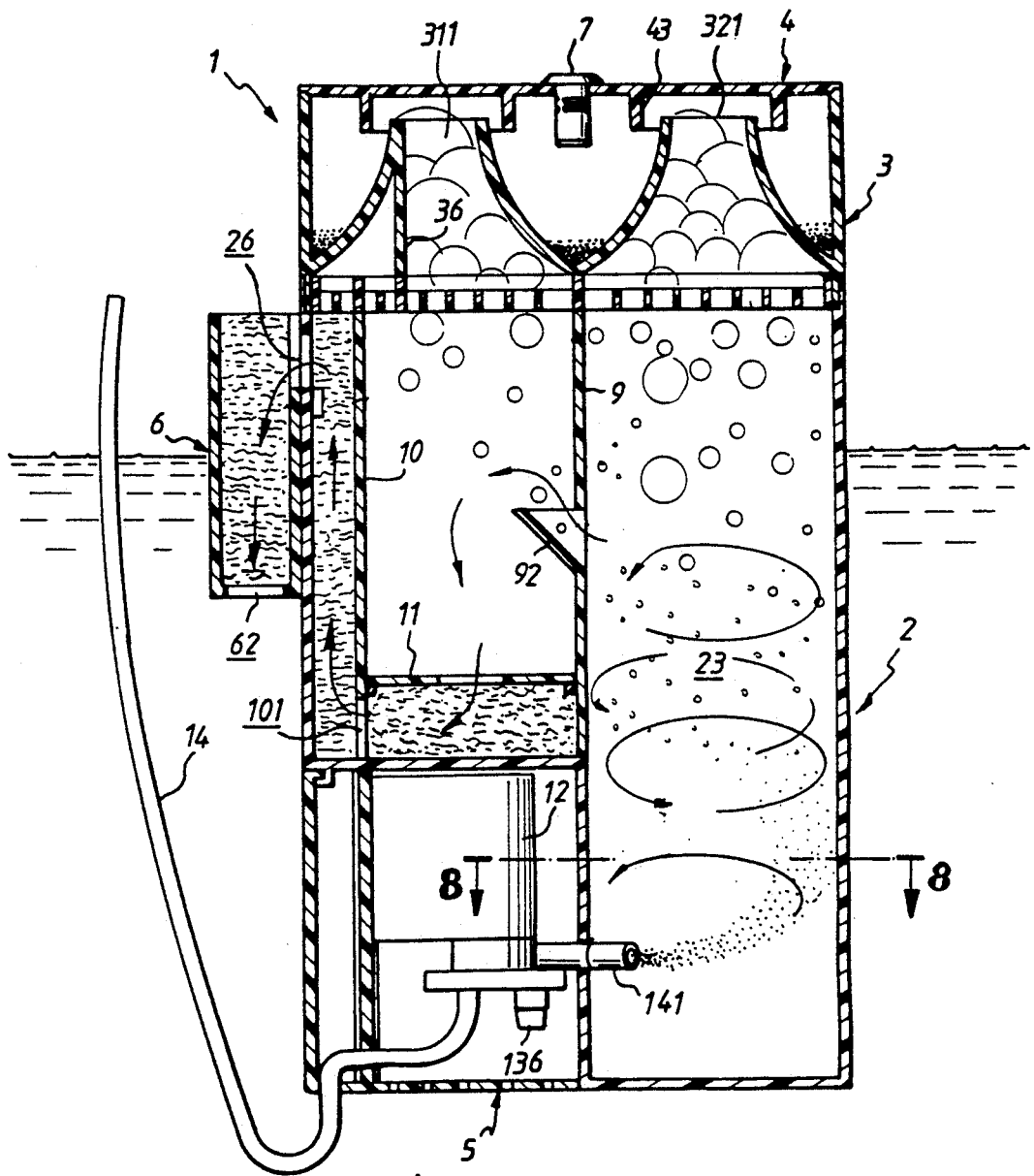
FIG. 6 shows the invention in filtering operation.

With reference to FIGS. 2, 3 and 6, the body (2) is substantially in the shape of an inverted "L". Two pairs of vertical guide slots (21, 22) are respectively provided on the interior surfaces of the front and rear walls of the body (2) at the central portion and the portion adjacent to the side of the comparatively shorter chamber. An intermediate partition plate (9) can be inserted into the guide slots (21) of the central portion, so as to divide the internal space of the body (2) into a large and a small bubble collecting chambers (23) and (24). The interior vertical wall of the large bubble collecting chamber (23) has a water inlet opening (25). The exterior vertical wall of the small bubble collecting chamber (24) has a water outlet (26) substantially in the shape of an inverted "凸". The central portion of the intermediate partition plate (9) is a transverse, rectangular opening (91) for dispersing the water and the retained bubbles. The intermediate partition plate (9) has a slanting flow guide plate (92) extending into the small bubble collecting chamber (24). The bottom end of the flow guide plate (92) is adapted to be in connection with the bottom edge of the flow guide opening (91). The intermediate partition plate (9) includes two protrusions (93) at the same side of the flow guide plate (92), disposing below the flow guide opening (91).

A side partition plate (10) can be inserted into the guide slots (22) so as to further define a second filtering chamber (30), which is close to the outlet (26), from the small bubble collecting chamber (24). The lower portion of the side partition plate (10) is provided with an arcuate drainage opening (101). Two protrusions (102) corresponding to the protrusions (93) of the intermediate partition plate (9) are provided on the side facing the small bubble collecting chamber (24), at a height in level with the drainage opening (101). A transverse partition plate (11) is provided with a circular drainage opening (111) at its intermediate portion and recessed angles (112) at four corners thereof. The transverse partition plate (11) may be placed into the small bubble collecting chamber (24) horizontally, and be supported in location by means of the protrusions (93) and (102), thereby further defining a first filtering chamber (29) from the small bubble collecting chamber (24). The recessed angles (112) of the transverse partition plate (11) are provided for accommodating the guide slots (21) and (22) of the body (2) during assembling The first and second filtering chambers (29) and (30) may be placed with filtering cotton (291, 301) of appropriate sizes optionally, so as to proceed the final stage of the filtering process.

The impurities collector (3) includes vertical side walls (35), and the bottom of which is provided with a left and a right bubble collecting cones (31) and (32)

having openings (311) and (321) respectively. The bottom end of the impurities collector (3) is provided with recessed edges (33) at the exterior thereof so that the collector (3) can be covered onto the body (2). A foam grid (8) comprising enclosing flanges (81) and a plurality of apertures (82) may be suitably placed in the interior of the recessed edges (33).

The top cover (4) includes a circular opening (41) at the center, and recessed edges (42) at the edges of the bottom portion thereto, so that the top cover (4) may cover the recessed edges (34) of the impurities collector (3). Annular flanges (43) corresponding to the cones (31, 32) are provided underneath the top cover (4) so that as the cover (4) is placed on the top of the collector (3), the annular flanges (43) are atop the cones (31, 32) at a spaced distance.

Figure 9:
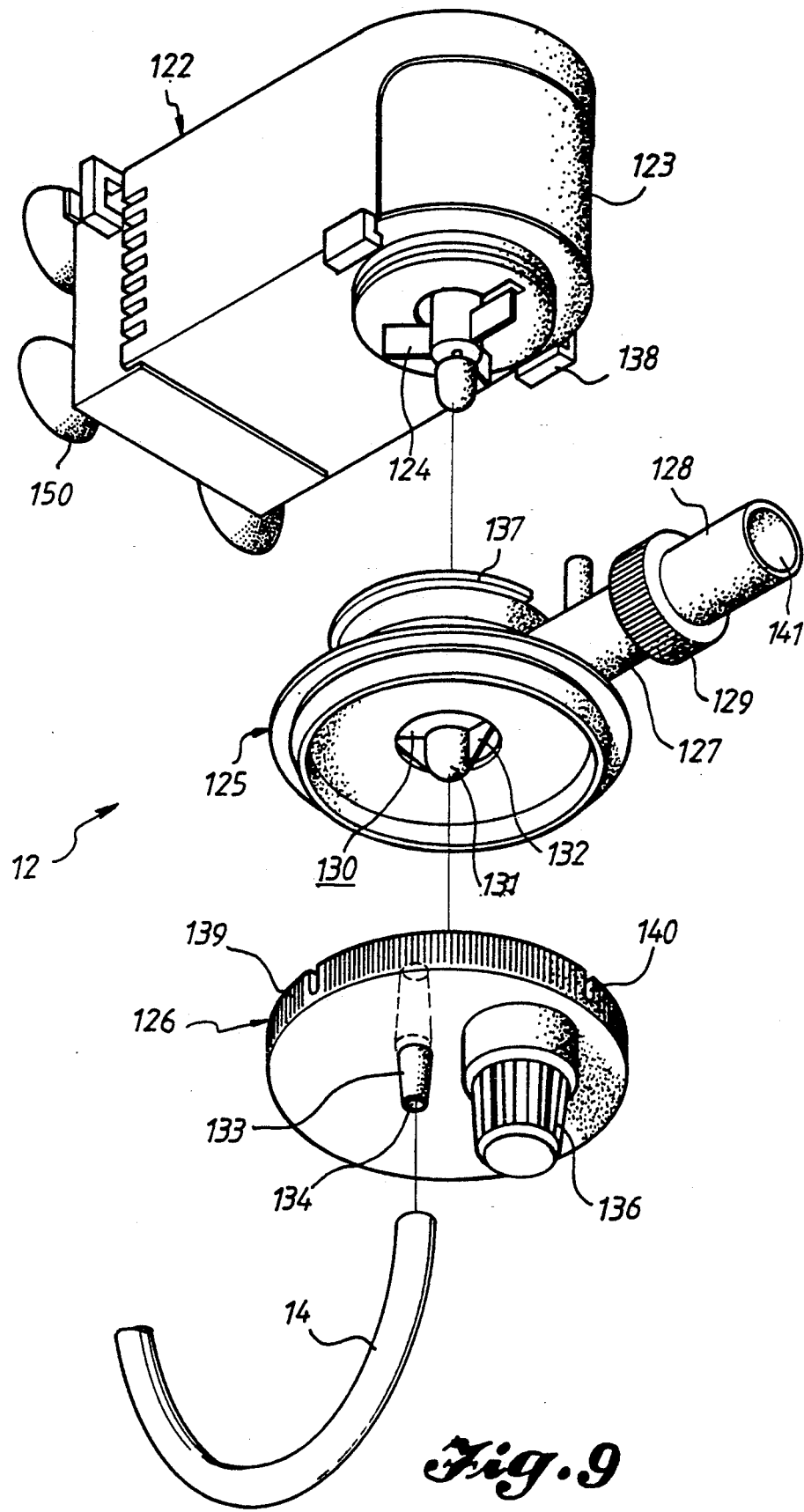
FIG. 9 is an exploded view of the power head in accordance with the invention.
Figure 10:
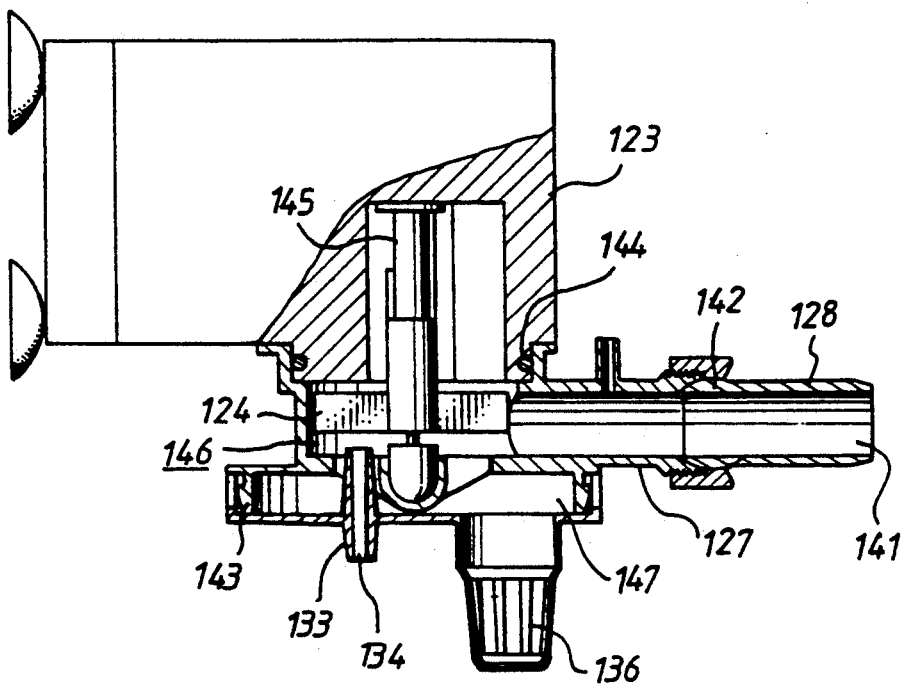
FIG. 10 is a schematic view showing the cross section of the power head.

A water-air mixing type pump (12) (also known as Power Head) may be disposed to the lower exterior of the small bubble collecting chamber (24) of the body (2) in a known manner, such as utilizing a plurality of suction cups 150 as shown in FIGS. 9 and 10. The blades rotated by the power head (12) may effect the quick mixing of the water sucked in from a strainer (136) and the air drawn in from an air hose (14). The resultant high density, minute air bubbles are then pumped into the lower portion of the large bubble collecting chamber (23) through a water inlet (141) which is disposed at the water inlet (25) and may have a slanting angle.

Figure 4:
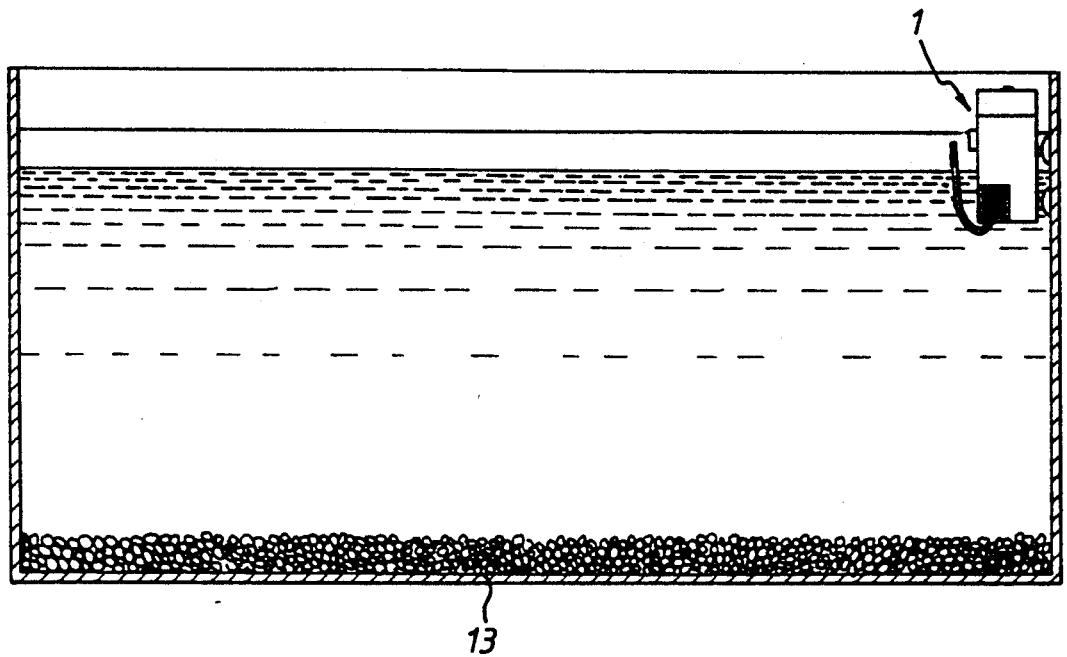
FIG. 4 is a reference drawings showing the subject protein skimmer being disposed inside an aquarium.
Figure 8:
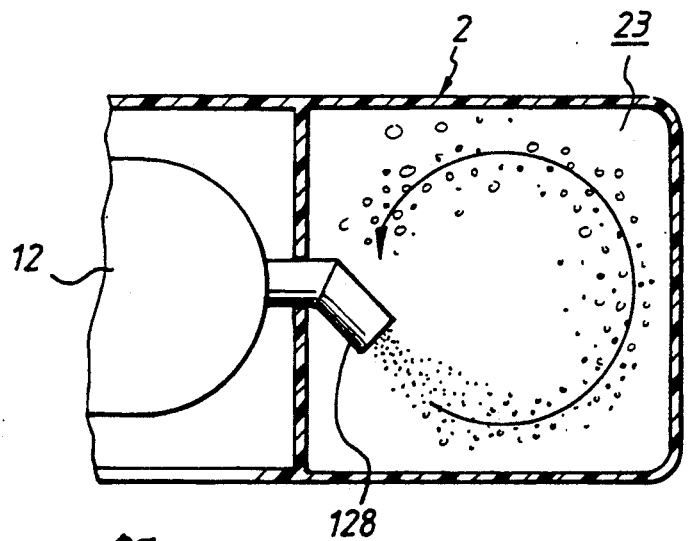
FIG. 8 is a cross-sectional view taken along the line 8—8 of FIG. 6.

As shown in FIGS. 4 and 6, in using the protein skimmer according to the invention, the skimmer is at first fixed to an appropriate height of the interior side wall of the aquarium (13). As the power head (12) operates, the water of the aquarium and the ambient air are drawn for mixing through the strainer (136) and air hose (14) respectively. As shown in FIG. 8, the water composed of high density, minute air bubbles is then pumped into the lower portion of the large bubble collecting chamber (23) of the body (2) through the inlet (141) in a slanting angle. The bubble water pumped vigorously into the space of the large bubble collecting chamber (23) will attain an upward swirling motion. The fine bubbles in the swirling motion on one hand absorb the impurities/dirts in the water and adhere the same onto the surfaces of the bubbles continuously, and on the other hand, combine with the surrounding minute bubbles to form larger bubbles which contain more impurities/dirts. The longer the bubbles in swirling motion, the more effective will be the bubbles to absorb the impurities. When a large proportion of the air bubbles float to the water surface of the interior of the skimmer to form bubbles of larger volumes, the larger volume bubbles will be pushed through the foam grids (8) by the pumped water continuously. The bubbles then move vertically upwards through the apertures (82) of the grid (8) into the interior of the right bubble collecting cone (32) of the impurities collector (3). As the bubbles overflow through the opening (321) of the right bubble collecting cone (32), they will slide along the right annular flange (43) of the top cover (4) and accumulate at the interior bottom of the impurities collector (3). Besides, as the bubbles are pushed upwards, the upper circular opening (41) can be used for discharging the air, so that the bubbles are smoothly pushed upwards to the cone opening during the operation.

The portion of the bubbles within the large bubble collecting chamber (23), which has not been pushed through the foam grid (8) and foamy in formation, flows into the small bubble collecting chamber (24) via the flow guide opening (91) of the intermediate partition plate (9). As the portion of the bubbles flows through the flow guide opening (91), due to the baffling of the flow guide plate (92), the bubbles will float upwards to become a swirl of flow. During the swirling motion, the water is further pushed by the pumped water and flows through the drainage opening (111) of the transverse partition plates (11). The retained air bubbles, however, continuously move upwards in the swirl of flow and join one another to form larger air bubbles until most of the bubbles are pushed upwards to reach the water surface to become foamy. The foamy bubbles are then pushed by the subsequent bubbles to pass through the foam grid (8), and move vertically upwards through the apertures (82) of the grid (8) into the interior of the left bubble collecting cone (31) of the impurities collector (3). Since the bubbles trapped in the small collecting chamber (24) are comparatively less in amount and the particles are comparatively minute, they do not tend to become foam in large size to float upwards and through the cone opening (311). Therefore, a rib (36) in conjunction with the left portion of the foam grid (8) is provided at the left portion of the interior of the cone (31) so as to reduce the diameter of the cone (31), thereby facilitating the floating motion of the foam. Besides, the apertures (82) of the grid (8) beyond the left portion of the rib (36) may be sealed during forming if necessary to preclude the outflow of the air bubbles. As the bubbles overflow through the opening (311) of the left bubble collecting cone (31), they will accumulate at the interior bottom of the impurities collector (3).

As a matter of fact, the water flowing into the first filtering chamber (29) via the drainage opening (111) is quite clean. However, to ascertain that the water may be effectively reduced and purified, the filtering cotton (291, 301) of appropriate sieve pores may be placed inside the first and/or second filtering chambers (29, 30) for further filtering as necessary. Therefore, the water drained from the drainage opening (111) will flow into the second filtering chamber (30) via the drainage opening (101) of the side partition plate (10) after being filtered by the filtering cotton (291). The water is further filtered by the filtering cotton (301) before discharging into the aquarium (13) through the outlet (26).

Some of the major components of the skimmer (1) such as the body (2), impurities collector (3), top cover (4), intermediate partition plate (9), side partition plate (10), and grid (8), etc. are preferably formed of acrylonitrile-butadiene-styrene plastics (ABS) or other appropriate transparent plastic materials so that the skimmer is pleasing to the eyes of the observers and the interior of the skimmer may be viewed conveniently to check the extent of accumulation of the impurities.

When the impurities collector (3) accumulates too much impurities and dirts, the collector (3), foam grid (8) and top cover (4) may be removed from the body (2) for disassembling and cleaning, and then reassembled for water filtering. If filtering cotton (291) and/or (301) is additionally provided in the first and/or second filtering chambers (29, 30), the intermediate partition plate (9), side partition plate (10) and transverse partition plate (11) may be drawn upwardly to detach from the guide slots (21, 22) of the body (2), so that the filtering cotton (291) and/or (301) can be removed for cleaning.

As shown in FIGS. 9 and 10, the power head (12) according to the subject invention comprises a pump body (122), a motor (123) mounted within the interior of the pump body (122), an impeller (124) mounted at the lower portion of the body (122) and to a rotating shaft (145) of the motor (123), an impeller housing (125) being provided at the lower portion of the motor enclosing the impeller (124), and a housing plate (126) being used to cover the bottom end of the impeller housing (125).

Figure 11:
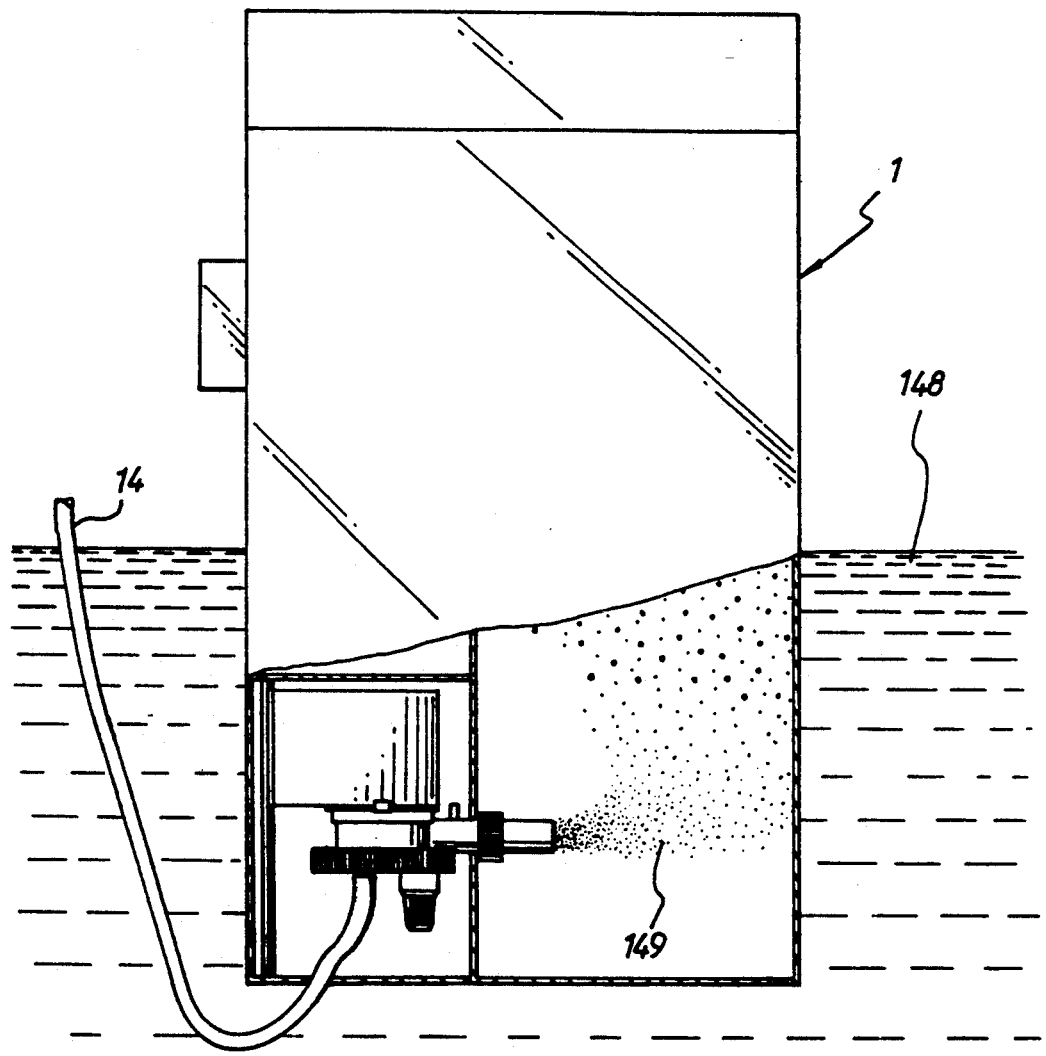
FIG. 11 is a schematic view showing the power head used in a protein skimmer.

The pump body (122) may comprises a plurality of suction cup (150) at its remote end for the mounting of the power head on the inner surface of an aquarium or at the external surface of the protein skimmer, as shown in FIG. 11. Obviously, any known measures may be used to mount the power head onto a predetermined position. The lower portion of the body (122), to the sides of the impeller (124), is provided with two L-shaped engaging members (138) for the engagement of the impeller housing (125).

The lateral sides of the top of the impeller housing (125) are each provided with a curved protrusion (137) which can be rotatably inserted into the engaging members (138) of the pump body (122). The bottom and the upper peripheral wall of the impeller housing (125) as well as the bottom surface of the body (122) define a mixing chamber (146), and the connecting face of the body (122) and the impeller housing (125) is provided with a sealing element (144). The center of the bottom of the impeller housing (125) is provided with a circular water inlet (130), a flow guide (131) is provided at the center of the water inlet (130) and is connected to the edge of the water inlet (130) by a plurality of ribs (132). The bottom surface of the impeller housing (125) is provided with a ring like protrusion (143) having an external diameter slightly smaller than that of the impeller housing (125). One end of the impeller housing (125) is provided with a bubbling water tube (127) having one end being threaded. An water injection tube (128) having a protruded surface (142) at one end thereof. A positioner (129) connects the bubbling water tube (127) with the water injection tube (128) to form a universal joint therebetween. The end portion of the water injection tube (128) forms a water inlet (141).

The upper surface of the housing plate (126) is provided with a peripheral enclosure (139) having a plurality of slots (140) for expansion and contraction. The external diameter of the enclosure (139) is the same size as that of the impeller housing (125) and the internal surface thereof may engage with the protrusion (143) of the impeller housing (125) to form a chamber (147). The bottom surface of the housing plate (126) is provided with a strainer (136) for filtering when the power head (12) turns on. An air inlet tube (133) having a pore (134) is provided at the bottom surface of the housing plate (126). The tube (133) is slightly tapered from its end to the bottom surface of the housing plate (126) for the mounting of an air hose (14). When the housing plate (126) is engaged with the lower portion of the impeller housing (125), the inner terminal of the air inlet tube (133) is adapted to fit into the water inlet (130) of the impeller housing (125) for directing ambient air into the mixing chamber (146).

It is to be noted that the inner terminal of the air inlet tube (133) has a distance of about 1 to 2 cm away from the impeller (124), preferably, a distance of 1 cm provides an excellent effect for the suction of air. If the power head (12) of the protein skimmer (1) is switched on, the motor (123) will drive the impeller (124) so that the water will be drawn to pass through the strainer (136) and the water inlet (130) and subsequently into the mixing chamber (146). At the same time, the air from the external is sucked in by the rotational suction force of the impeller (124) via the air hose (14) and the pore (134) of the air inlet tube (133). The sucked air and water are mixed by the fast rotation of the impeller (124). The mixed air-water having very fine bubbles is then discharged into the protein skimmer via the water tube (127) and the water inlet (141) of the injection tube (128).

If the interior of the aquarium (13) is arranged with a number of ornamental objects, a pump protection shield (5) may be placed so as to prevent the water plants and other ornamental objects from being sucked by the power head (12). The protection shield (5) includes three vertical walls and a bottom wall, with the top end and the side adjacent to the exterior side wall of the large bubble collecting chamber (23) open. The three vertical wall and the bottom wall are provided with a plurality of elongated penetrating holes (55) so that water may pass therethrough. Besides, the bottom wall of the protection shield (5) may include a cover hole (54). A sealing cover (56) having opening (57) for wires and air conduit to pass therethrough is placed to cover the cover hole (54) in a known fixing manner. For mounting, the upper and lower ends of the protection shield (5) may be provided with appropriate numbers of hooks (52, 53), and the lower edges of the exterior side walls of the large and small bubble collecting chambers (23, 24) are provided with slots (27, 28) in match with the hooks (52, 53), so that the protection shield (5) may be fixedly mounted. Besides, the interior of the shield (5) may further include an inner plate (51) on which the pump (12) may be fixed by means of a slide slot instead of the suction cups (150).

Figure 5:
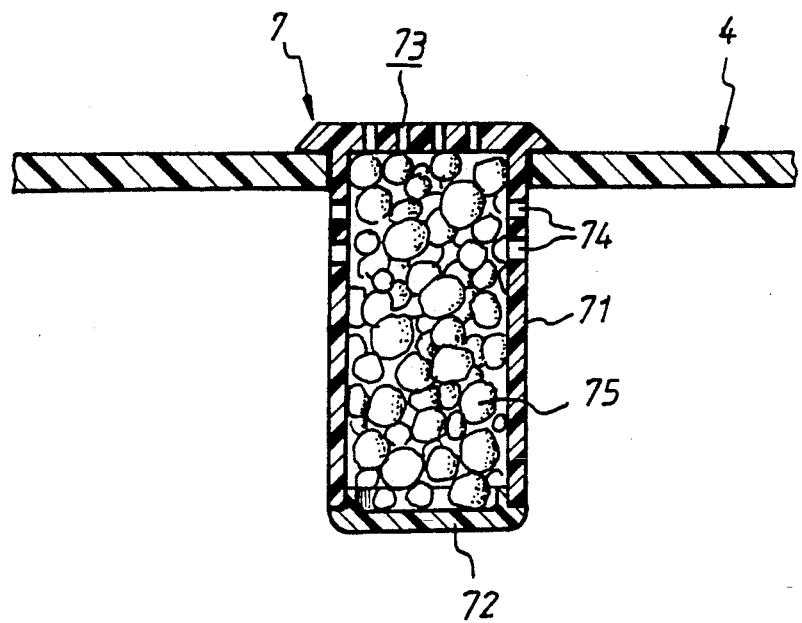
FIG. 5 is a schematic drawing showing that the top cover of the invention is provided with an activated carbon filter.

In practical usage, the water will become stinky and turns bad in quality after a long period of use, no matter how superior is the filtering effect of the skimmer. To overcome this drawback, an external skimmer (6) with activated carbon filtering cotton (63) disposed therein is mounted at the outlet (26) of the body (2), and an activated carbon filtering cup (7) is inserted through the circular opening (41) of the top cover (4), as illustrated in FIGS. 5 and 6.

Figure 7:
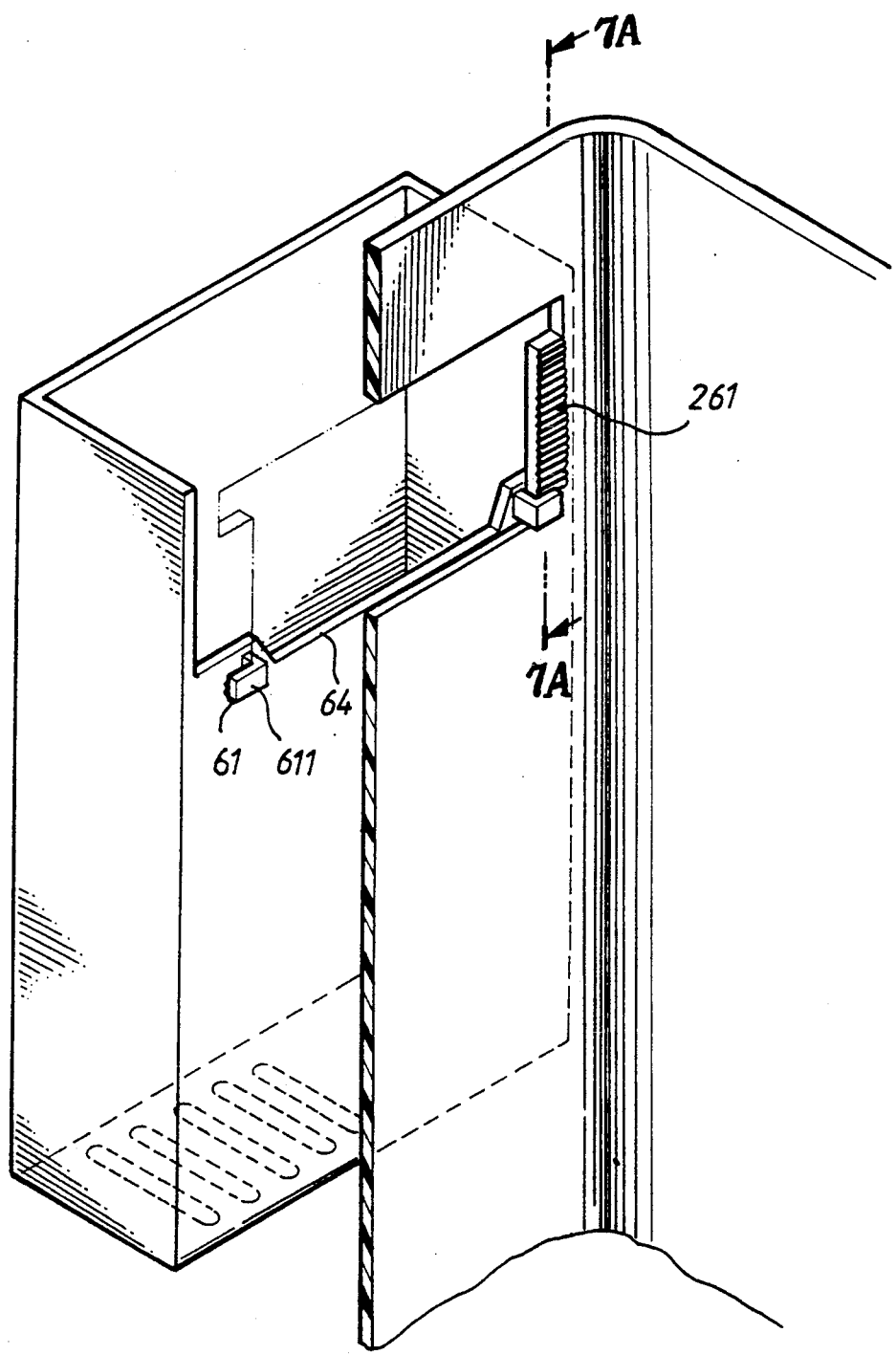
FIG. 7 is a detailed cross-sectional view illustrating that the subject protein skimmer is provided with an external skimmer at the water outlet thereof.
Figure 7A:
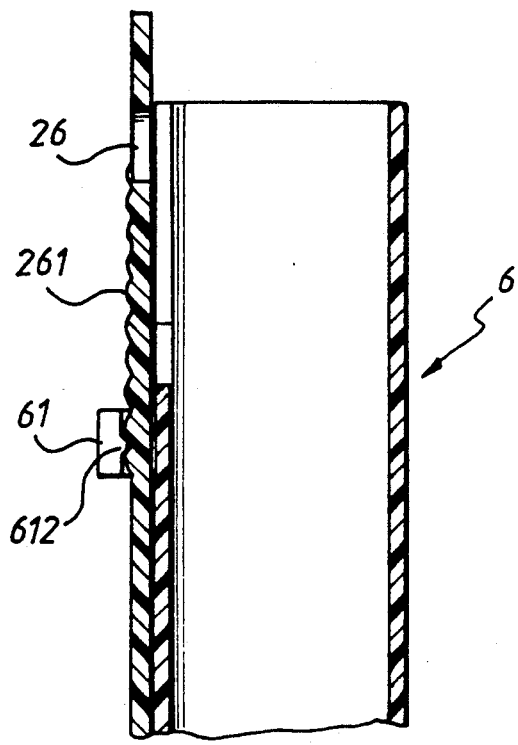
FIG. 7A is a detailed cross-sectional view taken along the line 7A—7A of FIG. 7.

As shown in FIG. 7, the top and the upper interior portion of the external skimmer (6) is open to receive the filtered water discharged from the outlet (26). The open, upper interior portion is further provided with an opening (64) recessed at the bottom and is substantially in the shape of an inverted trapezoid, to facilitate the discharging of water. Two outwardly protruding hooks (61) provided at both ends of the opening (64) of the internal wall are adapted to hook on both sides of the outlet (26) which are in the shape of an inverted '凹'. As shown in FIG. 7A, the internal wall surface of both sides of the outlet (26) may be provided with transverse grooves (261). The interior of the hook arm (611) of each hook (61) on the external skimmer (6) may be provided with at least one positioning flange (612). As the hooks (61) hook on both ends of the outlet (26), the positioning flanges (612) are suitably located in the transverse grooves (261), so that the external skimmer (6) is securely fixed in position. Since the hooks (61) are flexible, the positioning flanges (612), upon application of force by the user who pushes the external skimmer (6) upwardly or downwardly, may be moved to slide between the transverse grooves (261). Therefore, the external skimmer (6) may be fixed at random position as necessary. Furthermore, a plurality of elongated drainage openings (62) are provided at the bottom end wall of the external skimmer (6) so as to discharge the water filtered by the activated filtering cotton (63) back into the aquarium (13).

The activated carbon filtering cup (7) is composed of a cup body (71) and a sealing cover (72) closed at the bottom end. The filtering cup (7) is filled with a predetermined amount of particulate activated carbon (75). The upper surface of the cup body (71) has a plurality of venting holes (73) and both sides thereof are each provided with a number of symmetrical venting holes (74). After assembling, the filtering cup (7) may be inserted into the circular opening (41).

To eliminate the odor and color of the water, the air hose (14) is connected to an ozone pump (not shown). After actuation of the ozone pump and the power head (12) of the protein skimmer (1), the ozone will be transferred to the power head (12) by the air hose (14) to mix with water and pumped into the skimmer (1) to effect the reduction of the water. After that, the ozone bubbles will float and join with one another to become foams which are pushed upwards by the subsequent water and bubbles to accumulate inside the impurities collector (3). At this instant, the ozone has to be filtered and deodorized first by the filtering cup (7) before it is released to the atmosphere. The water which has been processed by the ozone and exit from the outlet (26) should be further filtered by the external skimmer (6) before discharging into the aquarium (13). By means of the aforementioned filtering processes, the water in the aquarium will be kept clean and fresh which is healthy to the fishes. Normally, the aforementioned deodorization and decolorization shall not be proceeded for more than six hours.

The preceding descriptions are directed to a preferred embodiment of the invention. Those skilled in the art may effect modifications and alterations thereto without departing from the spirit of the invention. However, it should be noted that the modifications and alterations are still within the scope of the following claims.

| Numeral references of the elements: | | | |
|---|---|---|---|
| 1. | Protein Skimmer | 2. | Skimmer Body |
| 3. | Impurities Collector | 4. | Top Cover |
| 5. | Pump Protection Shield | 6. | External Skimmer |
| 7. | Activated Carbon Filtering Cup | | |
| 8. | Foam Grid | | |
| 9. | Intermediate Partition Plate | | |
| 10. | Side Partition Plate | | |
| 11. | Transverse Partition Plate | 12. | Power Head |
| 13. | Aquarium | 14. | Air hose |
| 21. | Guide Slot of Intermediate Partition Plate | | |
| 22. | Guide Slot of Side Partition Plate | | |
| 23. | Large Bubble Collecting Chamber | | |
| 24. | Small Bubble Collecting Chamber | | |
| 25. | Water Inlet | 26. | Water Outlet |
| 27. | Upper Slot | 28. | Lower Slot |
| 29. | First Filtering Chamber | | |
| 30. | Second Filtering Chamber | | |
| 31. | Left Bubble Collecting Cone | | |
| 32. | Rught Bubble Collecting Cone | | |
| 33. | Bottom Recessed Edges | | |
| 34. | Top Recessed Edges | | |
| 35. | Impurities Collector Side Wall | | |
| 36. | Rib | 41. | Circular Opening |
| 42. | Recessed Edge | 43. | Annular Flange |
| 51. | Inner Plate | 52. | Upper Hook |
| 53. | Lower Hook | 54. | Cover Hole |
| 55. | Elongated Penetrating Hole | 56. | Sealing Cover |

| -continued | | | |
|---|---|---|---|
| Numeral references of the elements: | | | |
| 57. | Wire and Air Conduit Opening | 61. | Hook |
| 62. | Drainage Opening | | |
| 63. | Activated Carbon Cotton | 64. | Opening |
| 71. | Cup Body | 72. | Sealing Cover |
| 73. | Upper End Venting Hole | | |
| 74. | Side Venting Hole | | |
| 75. | Activated Carbon Particles | 81. | Flange |
| 82. | Grid Aperture | | |
| 91. | Flow Guide Opening | | |
| 92. | Flow Guide Plate | 93. | Protrusion |
| 101. | Drainage Opening | 102. | Protrusion |
| 111. | Drainage Opening | 112. | Recessed Angle |
| 122. | Pump Body | 123. | Motor |
| 124. | Impeller | 125. | Impeller Housing |
| 126. | Housing Plate | 127. | Water Tube |
| 128. | Injection Tube | 129. | Positioner |
| 130. | Water Inlet | 131. | Flow Guide |
| 132. | Rib | 133. | Air Inlet Tube |
| 134. | Pore | 136. | Strainer |
| 137. | Curved Protrusion | 138. | Engaging Member |
| 139. | Enclosure | 140. | Slot |
| 141. | Water Inlet | | |
| 142. | Protruded Surface | 143. | Protrusion |
| 144. | Sealing Element | 145. | Rotating Shaft |
| 146. | Mixing Chamber | 147. | Chamber |
| 148. | Water | | |
| 149. | Water containing fine bubbles | | |
| 150. | Suction Cup | | |
| 261. | Transverse Groove | | |
| 291. | First Filtering Cotton | | |
| 301. | Second Filtering Cotton | | |
| 311. | Left Cone Opening | | |
| 321. | Right Cone Opening | 611. | Hook Arm |
| 612. | Positioning Flange | | |

What I claimed is:

1. A protein skimmer for clearing the impurities in an aquarium, comprising:

(A) a skimmer body having an open top end and a water outlet and a water inlet located respectively at an upper and lower portion of one side of the body;

(B) an impurities collector adapted to be mounted atop the body, having an open top end and a right and a left bubble collecting cone substantially in the shape of an inverted trumpet located at the bottom of the interior of said impurities collector;

(C) a top cover for covering the upper end of the impurities collector, and a bottom edge of which includes a pair of annular flanges corresponding to the right and left bubble collecting cones; and (D) a power head mounted to a lower exterior portion of the body for pumping water and air into the body comprising an air hose which is connected to the power head and extends to reach the ambient air, the power head drawing in water and air for swift mixing, and then delivering the bubbled water into the skimmer body through the water inlet;

(E) a pair of vertical guide slots which are provided substantially at a central portion of the body and on the internal surfaces of a pair of side walls adjacent to the water inlet;

(F) an intermediate partition plate which has a flow guide opening at a central portion thereof, the underside of the opening facing the water outlet is slantingly provided with a flow guide plate of predetermined length, a pair of positioning protrusions are provided between the flow guide opening and a lower edge of intermediate partition plate, the intermediate partition plate is adapted to be inserted into the guide slots at the center of the body so as to divide the internal space of the body into a large bubble collecting chamber and a small bubble collecting chamber;

(G) a side partition plate which has a drainage opening, and a pair of protrusions corresponding to said protrusions of the intermediate partition plate are provided on a side thereof which faces the small bubble collecting chamber, and the side partition plate is adapted to be inserted into the guide slots of the body adjacent to the water outlet;

(H) a transverse partition plate which has a drainage opening at a center thereof, which is capable of being inserted horizontally into the small bubble collecting chamber and positioned on the protrusions of the intermediate and side partition plates so as to define a first filtering chamber with a second filtering chamber being defined by said side partition plate and said one side of the skimmer body, said filtering chambers for filtering water passing therethrough; and (I) a foam grid which has continuous peripheral flanges and a plurality of apertures said foam grid is adapted to be inserted into the impurities collector at the bottom thereof;

whereby the bubbled water supplied by the power head will produce continuous swirling motion within the body, all the bubbles will continuously absorb and adhere the impurities through the swirling motion, and join one another to become larger bubbles which contain impurities when reaching the water surface, the bubbles then pass through the apertures of the foam grid and overflow through the opening of the bubble collecting cones and accumulate within the impurities collector subsequently, the filtered water continues to flow through the drainage openings of the partition plates and is released through the outlet of the body.

2. The protein skimmer as claimed in claim 1, wherein the first and second filtering chambers contain filter cotton having minute sieve pores therein for further filtering and purification of water.

3. The protein skimmer as claimed in claim 1, further comprising a pump protection shield having a plurality of penetration openings at the walls thereof, said pump protection shield being provided at the lower exterior of the small bubble collecting chamber so as to isolate the fishes and decorative water plants in the aquarium from the pump.

4. The protein skimmer as claimed in claim 1, wherein the impurities collector includes an integrally formed rib in the left interior portion of the left bubble collecting cone, the bottom end of the rib is connected to the foam grid so as to isolate the foam from moving towards the left side, and to guide the floating of the foam.

5. The protein skimmer as claimed in claim 1, wherein the air hose of the power head is capable of being connected to an ozone pump, thereby replacing the air by the ozone for effecting the deodorization and decolorization of the water after long period of use.

6. The protein skimmer as claimed in claim 5, wherein the water outlet of the body is substantially in the shape of a "T" which tapers downwards, the skimmer further includes an external skimmer at the lower portion of the water outlet, and an activated carbon filtering cup covering the circular opening of the top cover.

7. The protein skimmer as claimed in claim 6, wherein both ends of the water outlet are provided with transverse grooves at the internal surface thereof, the top end of the external skimmer is open and the bottom end wall thereof is provided with a plurality of drainage openings, the interior of the external skimmer contains activated carbon cotton or filter cotton, the upper internal wall of the external skimmer includes an opening recessed at the bottom and is substantially in the shape of an inverted trapezoid, two outwardly protruding hooks are separately provided at the ends of the recessed opening of the internal wall and are adapted to hook on the interior of both sides of the water outlet, each of said hooks further includes a hook arm having at least a positioning flange at the interior thereof which is capable of being positioned on the transverse grooves beside the water outlet, thereby achieving a height adjustable insertion.

8. The protein skimmer as claimed in claim 6, wherein the activated carbon filtering cup comprises a cup body, a sealing cover closed at bottom end, and a predetermined amount of particulate activated carbon contained in the cup body, the upper surface of the cup body has a plurality of venting holes and both sides thereof are each provided with a number of symmetrical venting holes.

* * * * *